United States Patent
Oda

(10) Patent No.: US 12,480,416 B2
(45) Date of Patent: Nov. 25, 2025

(54) INLET GUIDE VANE AND ROTARY MACHINE

(71) Applicant: MITSUBISHI HEAVY INDUSTRIES COMPRESSOR CORPORATION, Hiroshima (JP)

(72) Inventor: Takashi Oda, Hiroshima (JP)

(73) Assignee: MITSUBISHI HEAVY INDUSTRIES COMPRESSOR CORPORATION, Hiroshima (JP)

( * ) Notice: Subject to any disclaimer, the term of this patent is extended or adjusted under 35 U.S.C. 154(b) by 0 days.

(21) Appl. No.: 19/040,482

(22) Filed: Jan. 29, 2025

(65) Prior Publication Data
US 2025/0270936 A1    Aug. 28, 2025

(30) Foreign Application Priority Data
Feb. 22, 2024    (JP) .................. 2024-025098

(51) Int. Cl.
*F01D 9/04* (2006.01)

(52) U.S. Cl.
CPC ........ *F01D 9/041* (2013.01); *F05D 2240/122* (2013.01)

(58) Field of Classification Search
CPC ................................................ F05D 2220/30
See application file for complete search history.

(56) References Cited

U.S. PATENT DOCUMENTS

| | | | | |
|---|---|---|---|---|
| 8,181,479 B2* | 5/2012 | Tsukamoto | ........... | F04D 29/441 415/193 |
| 8,826,666 B2* | 9/2014 | Kajimura | ................ | F23R 3/283 60/740 |
| 9,951,783 B2* | 4/2018 | Hasegawa | ........... | F04D 29/4213 |
| 2018/0080470 A1 | 3/2018 | Koga et al. | | |
| 2018/0223866 A1* | 8/2018 | Koga | .................... | F04D 29/462 |

FOREIGN PATENT DOCUMENTS

JP    2016-200119 A    12/2016

* cited by examiner

*Primary Examiner* — Courtney D Heinle
*Assistant Examiner* — Danielle M. Christensen
(74) *Attorney, Agent, or Firm* — Osha Bergman Watanabe & Burton LLP

(57) ABSTRACT

An inlet guide vane according to the disclosure includes a plurality of movable blades disposed at intervals in a circumferential direction of a rotor shaft and rotatable about a center axis extending in a radial direction of the rotor shaft. Each of the movable blades includes a first blade surface and a second blade surface extending in a direction connecting a leading edge and a trailing edge, and an inclined surface formed at a trailing end including the trailing edge and extending obliquely from the first blade surface to the second blade surface when viewed from the radial direction. The inclined surface is a flat surface whose cross-sectional shape viewed from the radial direction is inclined so as to be connected, at an acute angle, to the second blade surface at the trailing edge.

4 Claims, 4 Drawing Sheets

INLET GUIDE VANE AND ROTARY MACHINE

CROSS-REFERENCE TO RELATED APPLICATIONS

This application claims the benefit of priority to Japanese Patent Application Number 2024-025098 filed on Feb. 22, 2024. The entire contents of the above-identified application are hereby incorporated by reference.

TECHNICAL FIELD

The disclosure relates to an inlet guide vane and a rotary machine.

RELATED ART

A centrifugal compressor causes a working fluid to flow inside a rotating impeller, and compresses the working fluid in a gas state using a centrifugal force generated when the impeller rotates. As disclosed in JP 2016-200119 A, some of such centrifugal compressors have a structure in which an inlet guide vane is provided so as to adjust the flow rate of a working fluid introduced from the outside.

JP 2016-200119 A describes an inlet guide vane including a plate portion having a plate-like shape in which movable blades are disposed in a flow path. In a cross section orthogonal to a rotor shaft, the plate portion includes a bent portion inclined with respect to other portions at a leading end of the flow path on its upstream side. This enables air to flow into the flow path efficiently with a simple shape.

SUMMARY

In the inlet guide vane described above, a Karman vortex may be generated on the downstream side relative to the movable blades. When a Karman vortex is generated, the flow of the fluid having passed through the inlet guide vane is disturbed, which may not only cause a pressure loss, but also exert adverse effects such as noises and vibrations. Therefore, it is desired to suppress the generation of a Karman vortex due to the fluid having passed through the inlet guide vane.

The disclosure has been made to solve the above problems, and an object of the disclosure is to provide an inlet guide vane and a rotary machine that can suppress generation of a Karman vortex due to a fluid having passed through the inlet guide vane.

In order to solve the above problems, an inlet guide vane according to the disclosure includes a plurality of movable blades disposed at intervals in a circumferential direction of a rotor shaft and rotatable about a center axis extending in a radial direction of the rotor shaft. Each of the movable blades includes a first blade surface and a second blade surface extending in a direction connecting a leading edge and a trailing edge, and an inclined surface formed at a trailing end including the trailing edge and extending obliquely from the first blade surface to the second blade surface when viewed from the radial direction. The inclined surface is a flat surface whose cross-sectional shape viewed from the radial direction is inclined so as to be connected, at an acute angle, to the second blade surface at the trailing edge.

A rotary machine according to the disclosure includes: a rotor including a rotor shaft extending in an axial direction in which an axis extends with the axis as a center, and an impeller fixed to the rotor shaft; a casing covering the rotor and including a suction port through which a working fluid flows into the casing; and the inlet guide vane disposed in the casing on a first side in the axial direction with respect to the impeller.

In the inlet guide vane and the rotary machine of the disclosure, it is possible to suppress the generation of a Karman vortex due to a fluid having passed through the inlet guide vane.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments for implementing an inlet guide vane and a rotary machine according to the disclosure will be described with reference to the accompanying drawings. However, the disclosure is not limited only to these embodiments.

EMBODIMENTS

Configuration of Geared Compressor

Figure 1:
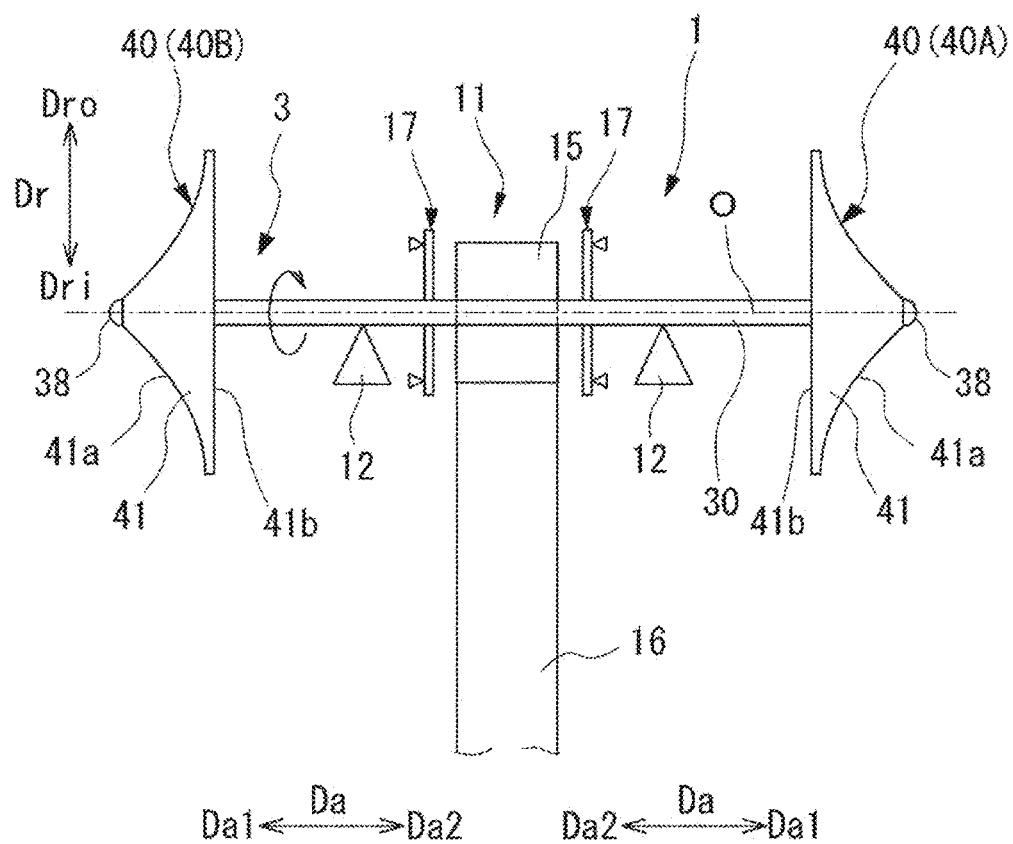
FIG. 1 is a diagram illustrating a schematic configuration of a rotary machine according to an embodiment of the disclosure.
Figure 2:
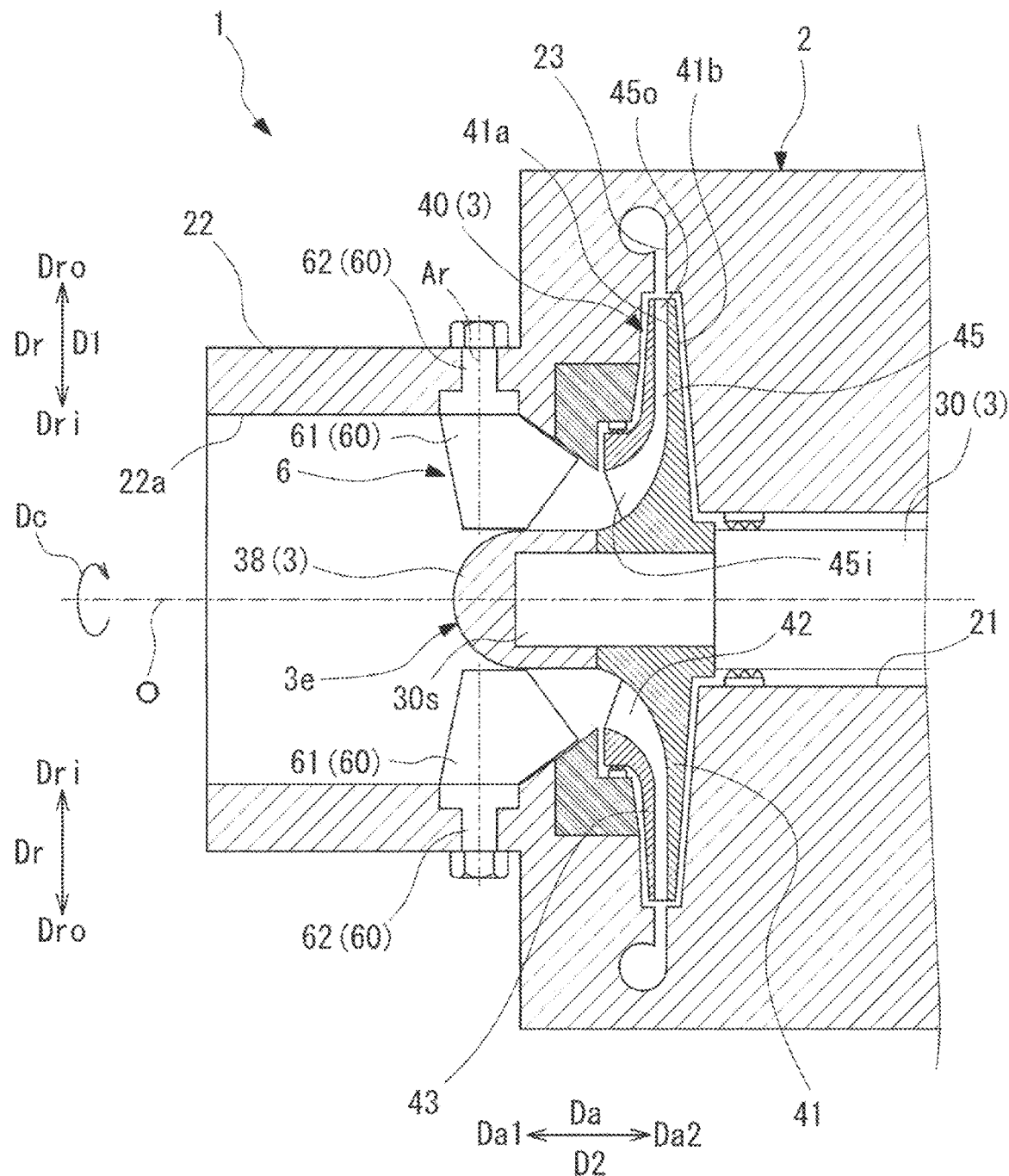
FIG. 2 is a cross-sectional view illustrating a configuration of the rotary machine in which movable blades of an inlet guide vane are in a fully-opened state.

As illustrated in FIGS. 1 and 2, a geared compressor (centrifugal compressor) 1 serving as a rotary machine according to the present embodiment mainly includes a rotor 3, a casing 2 (see FIG. 2), an inlet guide vane 6 (see FIG. 2), a radial bearing 12, and a thrust bearing 17.

Configuration of Rotor

The rotor 3 is rotatable about an axis O relative to the casing 2. The rotor 3 includes a rotor shaft 30, an impeller 40, and an impeller cap 38.

The rotor shaft 30 extends in an axial direction Da in which an axis O extends with the axis O as a center. As illustrated in FIG. 1, the rotor shaft 30 is supported by a pair of radial bearings 12 so as to be rotatable about the axis O. The pair of radial bearings 12 is disposed at an interval in the axial direction Da. The rotor shaft 30 is constrained from moving in the axial direction Da by a pair of thrust bearings 17. The pair of thrust bearings 17 is disposed between the pair of radial bearings 12 at positions spaced apart from each other on both sides of a pinion gear 15 described later in the axial direction Da.

The rotor shaft 30 is connected to an external drive source (not illustrated) such as a motor via a speed increase transmitter 11. The speed increase transmitter 11 includes the pinion gear 15 and a large-diameter gear 16. The pinion gear 15 is fixed to the rotor shaft 30 between the pair of radial bearings 12. The large-diameter gear 16 engages with the pinion gear 15. The large-diameter gear 16 is rotationally driven by the drive source. The large-diameter gear 16 is set to have a larger outside diameter dimension than that of the pinion gear 15. Thus, the rotational speed of the rotor shaft 30 having the pinion gear 15 fixed thereto is higher than the rotational speed of the large-diameter gear 16. That is, the speed increase transmitter 11 increases, via the pinion gear 15, the rotational speed of the large-diameter gear 16 rotated by the external drive source, and transmits the increased rotational speed to the rotor shaft 30.

Impellers 40 are disposed at opposite end portions of the rotor shaft 30 in the axial direction Da. In the present embodiment, each of the impellers 40 is a so-called closed impeller including a disc 41, a blade 42, and a cover 43 as illustrated in FIG. 2. Note that the impeller 40 may be an open impeller without the cover 43.

The disc 41 has a disc shape and is fixed to the rotor shaft 30. The disc 41 includes a first surface 41a facing the cover 43 in the axial direction Da and a second surface 41b facing the opposite side to the first surface 41a in the axial direction Da. The second surface 41b is a back surface of the impeller 40. Here, in the present embodiment, the geared compressor 1 includes one impeller 40 at each of both end portions of the rotor shaft 30 in the axial direction Da as illustrated in FIG. 1. Each of the impellers 40 is disposed in such a manner that, in the axial direction Da, the second surface 41b of the disc 41, which is a back surface, faces the pinion gear 15 and the first surface 41a faces the end portion of the rotor shaft 30 on the side opposite to the pinion gear 15. That is, a first stage impeller 40A provided at a first end of the rotor shaft 30 and a second stage impeller 40B provided at a second end of the rotor shaft 30 are disposed with the discs 41 facing opposite to each other in the axial direction Da such that their back surfaces face each other.

In the following description, in each of the impellers 40, a side of the disc 41 near the first surface 41a is referred to as a first side Da1 in the axial direction Da, and another side of the disc 41 near the second surface 41b is referred to as a second side Da2 in the axial direction Da. That is, the first side Da1 in the axial direction Da and the second side Da2 in the axial direction Da are inverse between the first stage impeller 40A and the second stage impeller 40B.

As illustrated in FIG. 2, the blade 42 extends from the first surface 41a of the disc 41 to the cover 43. A plurality of blades 42 are disposed at intervals in a circumferential direction Dc of the rotor shaft 30 around the axis O.

The cover 43 is disposed on the first side Da1 in the axial direction Da with respect to the disc 41 and the plurality of blades 42. The cover 43 has a disc shape and is formed to cover the plurality of blades 42.

A working fluid (e.g., air) flows from the first side Da1 in the axial direction Da toward the second side Da2 in the axial direction Da with respect to the impeller 40. In each of the impellers 40, an impeller flow path 45 is formed between the disc 41 and the cover 43. The impeller flow path 45 includes an inflow port 45i and an outflow port 45o. The inflow port 45i is open to face the first side Da1 in the axial direction Da on an inner side Dri in a radial direction Dr in the impeller 40. Here, the radial direction Dr is a radial direction Dr of the rotor shaft 30 centered on the axis O. The outflow port 45o is open toward an outer side Dro in the radial direction Dr in the impeller 40.

A shaft end 30s which is an end portion of the rotor shaft 30 in the axial direction Da protrudes toward the first side Da1 in the axial direction Da with respect to the impeller 40. An impeller cap 38 is fixed to the shaft end 30s. The impeller cap 38 rotates together with the rotor shaft 30. The impeller cap 38 forms a rotor end portion 3e which is an end portion of the rotor 3 in the axial direction Da. The impeller cap 38 restricts the movement of the impeller 40 in the axial direction Da. That is, the impeller cap 38 constrains the position of the impeller 40 in the axial direction Da such that the impeller 40 does not fall off from the rotor shaft 30.

Configuration of Casing

As illustrated in FIG. 2, the casing 2 is formed to cover the rotor 3. The casing 2 is made of metal and forms an outer shell of the geared compressor 1. The casing 2 includes a shaft insertion hole 21, into which the rotor shaft 30 is inserted, on the second side Da2 in the axial direction Da with respect to the position at which the impeller 40 is disposed. The casing 2 includes an intake nozzle 22 and an exhaust flow path 23 around each of the impellers 40.

The intake nozzle 22 allows the working fluid to flow into the interior of the casing 2. The intake nozzle 22 is formed in a tubular shape extending in the axial direction Da. A suction port 22a centered on the axis O is formed inside the intake nozzle 22. The intake nozzle 22 communicates, through the suction port 22a, with the outside of the casing 2 and with the inflow port 45i of the impeller flow path 45 opened to the inner side Dri in the radial direction Dr in the impeller 40. When the impeller 40 rotates in the circumferential direction Dc around the axis O, the working fluid is sucked from the outside into the interior of the casing 2 through the suction port 22a.

The exhaust flow path 23 allows the working fluid inside the casing 2 to flow out of the casing 2. The exhaust flow path 23 is formed on the outer side Dro in the radial direction Dr relative to the outflow port 45o of the impeller flow path 45. The exhaust flow path 23 has a spiral shape continuous in the circumferential direction Dc.

Configuration of Inlet Guide Vane

The inlet guide vane 6 controls the flow rate of the working fluid passing through the suction port 22a. The inlet guide vane 6 is disposed on the inner side Dri of the intake nozzle 22 of the casing 2. That is, the inlet guide vane 6 is disposed on the first side Da1 in the axial direction Da with respect to the impeller 40 in the casing 2. The inlet guide vane 6 includes a plurality of movable blades 60. The plurality of movable blades 60 are disposed so as to protrude into the suction port 22a having a circular cross section when viewed from the axial direction Da. The plurality of movable blades 60 are disposed at equal intervals in the circumferential direction Dc around the axis O along the inside surface of the intake nozzle 22.

Figure 3:
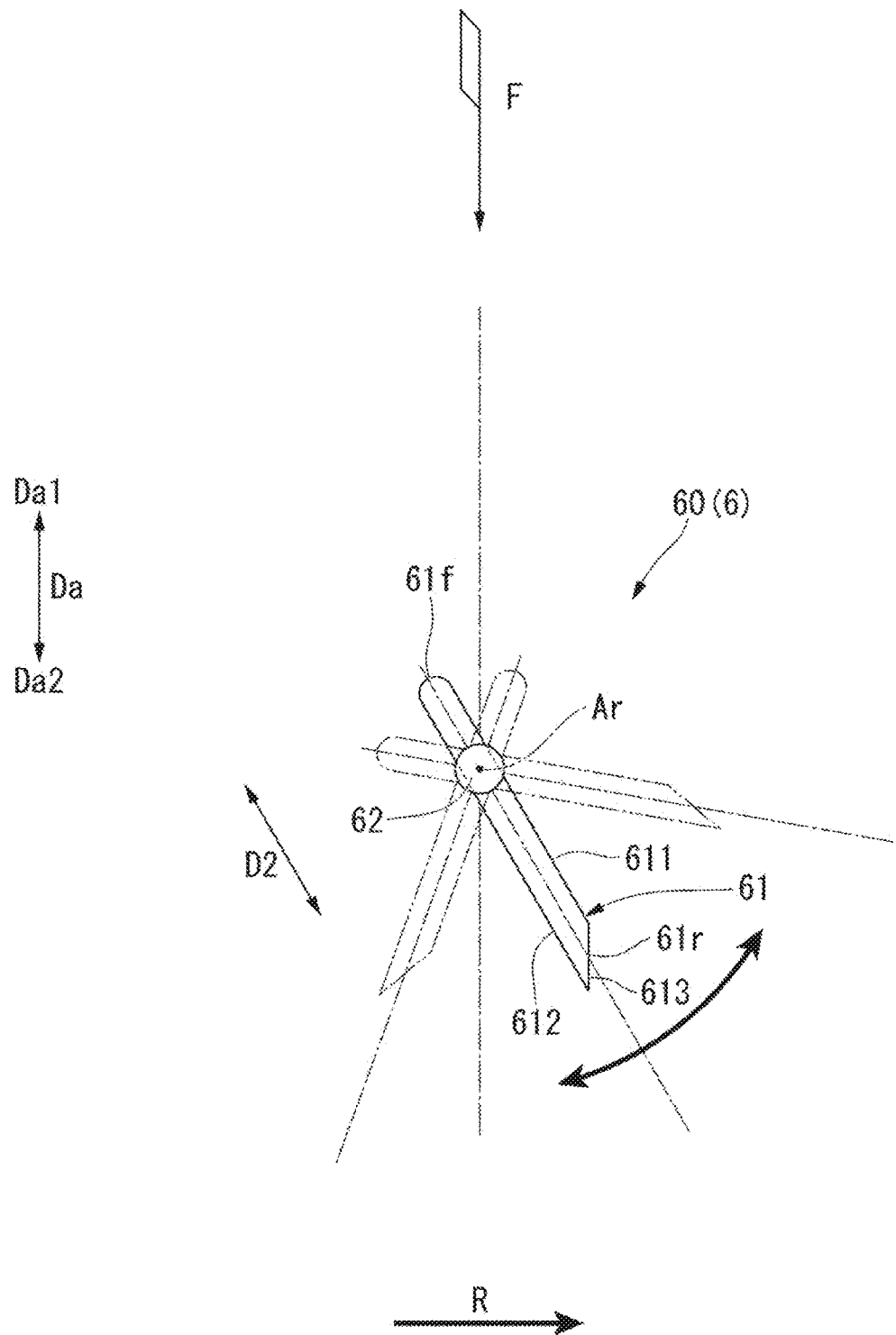
FIG. 3 is a schematic diagram illustrating the inlet guide vane as viewed from a radial direction.

Each of the movable blades 60 is rotatable about a center axis Ar extending in the radial direction Dr. As illustrated in FIG. 3, the plurality of movable blades 60 increase the opening degree by rotating toward the reverse side to a rotational direction R of the rotor shaft 30. Here, the rotational direction R is a direction in which the rotor shaft 30 is directed from the rear side toward the front side in the circumferential direction Dc.

Here, a state in which a blade chord direction D2 of the movable blades 60 is parallel to a flow direction F (the axial direction Da) of the working fluid is referred to as a fully-opened state of the movable blades 60. That is, the fully-opened state is a rotated state in which each of the movable blades 60 (blade main bodies 61) becomes thickest in a cross-sectional view parallel to the axis O. When the movable blades 60 are brought into the fully-opened state, the flow rate of the working fluid passing through the suction port 22*a* becomes 100%. When the movable blades 60 further rotate in the same direction as the rotational direction R of the rotor shaft 30 from the fully-opened state as viewed from the radial direction Dr, the flow rate of the working fluid passing through the suction port 22*a* becomes 120%. A state in which the movable blades 60 are arranged in this manner is referred to as an over-opened state of the movable blades 60. On the other hand, when each of the movable blades 60 is rotated around the center axis Ar from the fully-opened state toward the reverse side to the rotational direction R of the rotor shaft 30 as viewed from the radial direction Dr such that the blade chord direction D2 intersects the flow direction F (the axial direction Da) of the working fluid, then, the suction port 22*a* is gradually closed by the blade main bodies 61. As a result, the flow rate of the working fluid flowing from the suction port 22*a* into the impeller 40 through the inlet guide vane 6 is reduced. A state in which the blade chord direction D2 is orthogonal to the flow direction F (the axial direction Da) of the working fluid is referred to as a fully-closed state of the movable blades 60. That is, the fully-closed state is a rotated state in which each of the movable blades 60 (the blade main bodies 61) becomes thinnest in a cross-sectional view parallel to the axis O. As illustrated in FIGS. 2 and 3, in the present embodiment, each of the movable blades 60 includes the blade main body 61 and a shaft portion 62.

Each blade main body 61 extends so as to protrude from the inside surface of the intake nozzle 22 in a blade height direction D1 which is a direction (the radial direction Dr) in which the center axis Ar extends. Here, a direction connecting a leading edge 61*f* and a trailing edge 61*r* of the blade main body 61 having a blade cross-sectional shape, and orthogonal to the blade height direction D1 (the radial direction Dr) is referred to as the blade chord direction D2. The blade main body 61 includes a first blade surface 611, a second blade surface 612, and an inclined surface 613.

The first blade surface 611 and the second blade surface 612 extend in the blade chord direction D2. Each of the first blade surface 611 and the second blade surface 612 is formed of a flat surface whose cross-sectional shape viewed from the radial direction Dr forms a straight line along the blade chord direction D2. That is, the first blade surface 611 and the second blade surface 612 are not formed with irregularities or curved surfaces when viewed from the radial direction Dr. Thus, the blade main body 61 has a flat plate-like shape extending in the blade chord direction D2 in cross section viewed from the radial direction Dr. The first blade surface 611 and the second blade surface 612 are parallel to each other. In the blade chord direction D2, the second blade surface 612 is formed to be longer than the first blade surface 611. The first blade surface 611 is located in front of the second blade surface 612 in the rotational direction R of the rotor shaft 30.

The inclined surface 613 is formed at a trailing end including the trailing edge 61*r*. The inclined surface 613 extends obliquely from the first blade surface 611 to the second blade surface 612. The inclined surface 613 is a flat surface whose cross-sectional shape viewed from the radial direction Dr is inclined so as to be connected, at an acute angle, to the second blade surface 612 at the trailing edge 61*r*. Thus, the inclined surface 613 is inclined to face the first side Da1 of the axial direction Da so as to be opposed to the suction port 22*a* when the movable blade 60 is in the fully-closed state. The inclined surface 613 is formed as a flat surface forming a straight line without irregularities or curved surfaces when viewed from the radial direction Dr.

The angle of the inclined surface 613 with respect to the first surface 41*a* and the second surface 41*b* is constant in the blade height direction D1. The inclined surface 613 is inclined at an angle of 15° or more and 45° or less with respect to the second blade surface 612 when viewed from the radial direction Dr. Preferably, the inclined surface 613 is inclined at an angle of 25° or more and 35° or less with respect to the second blade surface 612 when viewed from the radial direction Dr. The trailing end at which the inclined surface 613 is formed is a partial region including the trailing edge 61*r* located away from the center axis Ar when the movable blade 60 is viewed from the radial direction Dr. The trailing end is a region of ⅓ or less, and in the present embodiment, a region of ¼ or less, of the total length of the movable blade 60 in the blade chord direction D2.

As illustrated in FIG. 2, the shaft portion 62 is formed to protrude from the blade main body 61 toward the outer side Dro in the radial direction Dr. The shaft portion 62 is formed integrally with the blade main body 61. The shaft portion 62 is inserted into a shaft support hole 22*h* formed in the intake nozzle 22. The shaft portion 62 is rotatable about the center axis Ar by a blade drive device (not illustrated) in a state of being inserted in the shaft support hole 22*h*. Thus, the blade main body 61 is rotatable about the center axis Ar integrally with the shaft portion 62. In each of the movable blades 60, the angle of the blade main body 61 with respect to the flow direction F (the axial direction Da) of the working fluid flowing through the suction port 22*a* is adjusted by rotating the blade main body 61 about the center axis Ar. The inlet guide vane 6 is opened and closed by rotating each of the plurality of movable blades 60 about the center axis Ar.

In the geared compressor 1 described above, when the impeller 40 rotates integrally with the rotor shaft 30, the working fluid is sucked into the intake nozzle 22 of the casing 2 from the suction port 22*a*. In the suction port 22*a*, the flow rate of the working fluid is adjusted by the opening degree of the inlet guide vane 6 when the working fluid passes through the inlet guide vane 6. The working fluid having passed through the inlet guide vane 6 is drawn into the impeller flow path 45 from the intake nozzle 22 through the inflow port 45*i*. The working fluid flows from the inflow port 45*i* toward the outflow port 45*o* by a centrifugal force generated by the impeller 40 rotating integrally with the rotor shaft 30. The working fluid is compressed while flowing from the inflow port 45*i* toward the outflow port 45*o*. The compressed working fluid flows out from the outflow port 45*o* to the outer side Dro in the radial direction Dr to be fed to the exhaust flow path 23 on the outer side Dro in the radial direction Dr. The working fluid is further compressed while swirling around the axis O along the exhaust flow path 23.

Operational Effects

In the inlet guide vane 6 and the geared compressor 1 described above, the inclined surface 613 is formed at the trailing end of the movable blade 60 so as to extend obliquely from the first blade surface 611 to the second blade surface 612 and be connected at an acute angle to the second blade surface 612 at the trailing edge 61*r*. That is, the trailing end of the movable blade 60 has an asymmetrical shape due to the inclined surface 613 when viewed from the radial direction Dr. As a result, it is possible to suppress the generation of a Karman vortex due to a fluid having passed through the inlet guide vane 6.

In addition, each of the first blade surface 611 and the second blade surface 612 is formed of a flat surface whose cross-sectional shape viewed from the radial direction Dr forms a straight line along the blade chord direction D2. The first blade surface 611 and the second blade surface 612 are parallel to each other. That is, the movable blade 60 has a linear shape. Thus, when the inlet guide vane 6 is brought close to the fully-closed state, a gap between the movable blades 60 adjacent to each other can be reduced. Accordingly, the leakage amount of the working fluid flowing through the gap can be reduced. As a result, even when the opening degree of the inlet guide vane 6 is low, opening-degree characteristics can be improved.

In addition, since the inclined surface 613 is formed as a flat surface, the workability of the inclined surface 613 can be improved. As a result, it is possible to easily form such a shape as to suppress the generation of a Karman vortex at the trailing end of the movable blade 60. Further, since not only the inclined surface 613, but also the first blade surface 611 and the second blade surface 612 are formed as flat surfaces, the workability of the movable blade 60 in its entirety can be improved. As a result, not only the inclined surface 613, but also the movable blade 60 itself can be easily formed.

The inclined surface 613 is inclined at an angle of 15° or more and 45° or less with respect to the second blade surface 612 when viewed from the radial direction Dr. Since the inclined surface 613 is inclined at an angle of 15° or more with respect to the second blade surface 612, the generation of a Karman vortex can be suppressed with a high probability. Further, since the inclined surface 613 is inclined at an angle of 45° or less with respect to the second blade surface 612, separation of the working fluid flowing along the inclined surface 613 can be suppressed.

The plurality of movable blades 60 increase the opening degree by rotating toward the reverse side to the rotational direction R of the rotor shaft 30. The first blade surface 611 is located in front of the second blade surface 612 in the rotational direction R. Accordingly, in the movable blades 60, when the opening degree is increased, the flow path between the movable blades 60 adjacent to each other at the trailing end is further widened by the inclined surfaces 613. Thus, the head of the compressor can further be raised when the opening degree of the movable blades 60 is increased. Therefore, it is possible to further improve the performance of the compressor when the movable blades 60 are in the over-opened state.

Modifications

Next, an inlet guide vane 6A of a modification example according to the disclosure will be described. Note that in the following description of the modification example, common components to those in the embodiment described above are denoted by the same reference signs in the drawings, and descriptions thereof are omitted. In the modification example, the rotational direction R of the rotor shaft 30 is different from that in the above-described embodiment.

Figure 4:
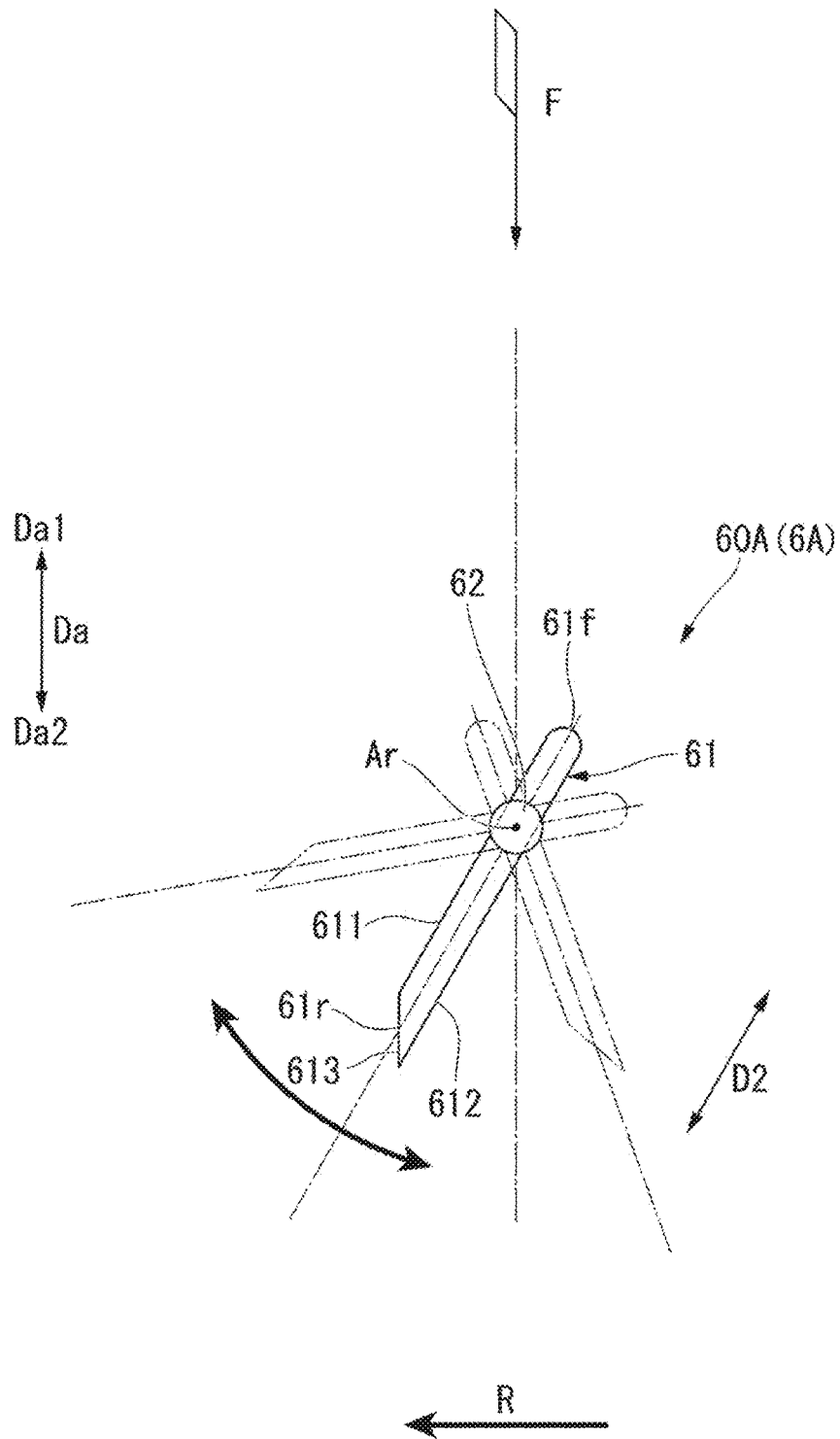
FIG. 4 is a schematic diagram illustrating an inlet guide vane of a modification example as viewed from the radial direction.

As illustrated in FIG. 4, the rotational direction R of the rotor shaft 30 is reversed to that in the above-described embodiment. That is, a direction in which the rotor shaft 30 rotates in the circumferential direction Dc from the rear side to the front side in the circumferential direction Dc is reversed to that in the embodiment. In addition, a plurality of movable blades 60A increase the opening degree by rotating toward the reverse side to the rotational direction R of the rotor shaft 30. Thus, in the inlet guide vane 6A of the modification example, the direction of rotation of the plurality of movable blades 60A is different from that in the embodiment.

Even in the inlet guide vane 6A of the modification example described above, similarly to the embodiment, the trailing end of the movable blade 60A has an asymmetrical shape due to the inclined surface 613 when viewed from the radial direction Dr. As a result, it is possible to suppress the generation of a Karman vortex due to a fluid having passed through the inlet guide vane 6A. That is, regardless of the rotational direction R of the rotor shaft 30, the generation of a Karman vortex can be suppressed by the inclined surface 613.

Other Embodiments

Although the embodiment of the disclosure has been described in detail with reference to the accompanying drawings, specific configurations are not limited to the embodiment, and include design modifications and the like without departing from the gist of the disclosure.

In the above-described embodiment, as an aspect of the geared compressor 1, a so-called single-shaft two-stage configuration has been described as an example. However, the aspect of the geared compressor 1 is not limited thereto, and the geared compressor 1 may include a two-shaft four-stage configuration or a configuration of more shafts and more stages, in accordance with design, specifications, and the like.

The rotary machine of the disclosure is not limited to a geared compressor, and may be a single shaft multi-stage centrifugal compressor or the like in which the rotor shaft 30 is rotationally driven directly by an external drive source, or a gas turbine, a steam turbine, or the like.

In addition, the first blade surface 611 is not limited to being located in front of the second blade surface 612 in the rotational direction R. For example, in contrast to the embodiment and the modification example, the first blade surface 611 may be located behind the second blade surface 612 in the rotational direction R. In a case where the first blade surface 611 and the second blade surface 612 are arranged in this manner, the inclined surface 613 is inclined to face the second side Da2 in the axial direction Da so as to be opposed to the impeller 40 when the movable blade 60 is in the fully-closed state.

Supplementary Notes

The inlet guide vane 6, 6A and the rotary machine 1 described in the embodiment are understood as follows, for example.

(1) An inlet guide vane 6, 6A according to a first aspect includes a plurality of movable blades 60, 60A disposed at intervals in a circumferential direction Dc of a rotor shaft 30 and rotatable about a center axis extending in a radial direction Dr of the rotor shaft 30. Each of the movable blades 60, 60A includes a first blade surface 611 and a second blade surface 612 extending in a direction connecting a leading edge 61f and a trailing edge 61r, and an inclined surface 613 formed at a trailing end including the trailing edge 61r and extending obliquely from the first blade surface 611 to the second blade surface 612 when viewed from the radial direction Dr. The inclined surface 613 is a flat surface whose cross-sectional shape viewed from the radial direction Dr is inclined so as to be connected, at an acute angle, to the second blade surface 612 at the trailing edge 61r.

Accordingly, the trailing end of the movable blade 60, 60A has an asymmetrical shape due to the inclined surface 613 when viewed from the radial direction Dr. As a result, it is possible to suppress the generation of a Karman vortex due to a fluid having passed through the inlet guide vane 6, 6A.

(2) An inlet guide vane 6, 6A according to a second aspect is the inlet guide vane 6, 6A according to (1), wherein each of the first blade surface 611 and the second blade surface 612 is formed of a flat surface whose cross-sectional shape viewed from the radial direction Dr forms a straight line in a direction connecting the leading edge 61f and the trailing edge 61r, and the first blade surface 611 and the second blade surface 612 are parallel to each other.

Accordingly, the movable blade has a linear shape. Thus, when the inlet guide vane 6, 6A is brought close to the fully-closed state, a gap between the movable blades 60, 60A adjacent to each other can be reduced. Accordingly, the leakage amount of the working fluid flowing through the gap can be reduced. As a result, even when the opening degree of the inlet guide vane 6, 6A is low, opening-degree characteristics can be improved.

(3) An inlet guide vane 6, 6A according to a third aspect is the inlet guide vane 6, 6A according to (1) or (2), wherein the inclined surface 613 is inclined at an angle of 15° or more and 45° or less with respect to the second blade surface 612 when viewed from the radial direction Dr.

Since the inclined surface 613 is inclined at an angle of 15° or more with respect to the second blade surface 612, the generation of a Karman vortex can be suppressed with a high probability. Further, since the inclined surface 613 is inclined at an angle of 45° or less with respect to the second blade surface 612, the separation of the working fluid flowing along the inclined surface 613 can be suppressed.

(4) An inlet guide vane 6, 6A according to a fourth aspect is the inlet guide vane 6, 6A according to any one of (1) to (3), wherein the plurality of movable blades 60, 60A increase an opening degree by rotating toward a reverse side to the rotational direction R of the rotor shaft 30, and the first blade surface 611 is located in front of the second blade surface 612 in the rotational direction R.

Accordingly, in the movable blades 60, 60A, when the opening degree is increased, the flow path between the movable blades 60, 60A adjacent to each other at the trailing end is further widened by the inclined surfaces 613. Thus, the head of the compressor can further be raised when the opening degree of the movable blades 60, 60A is increased. Therefore, it is possible to further improve the performance of the compressor when the movable blades 60, 60A are in the over-opened state.

(5) A rotary machine 1 according to a fifth aspect includes: a rotor 3 including a rotor shaft 30 extending in an axial direction Da in which an axis O extends with the axis O as a center of the rotor shaft 30, and an impeller 40 fixed to the rotor shaft 30; a casing 2 covering the rotor 3 and including a suction port 22a through which a working fluid flows into the casing 2; and the inlet guide vane 6, 6A according to any one of (1) to (4) disposed in the casing 2 on a first side Da1 in a direction of the axis O with respect to the impeller 40.

While preferred embodiments of the disclosure have been described as above, it is to be understood that variations and modifications will be apparent to those skilled in the art without departing from the scope and spirit of the disclosure. The scope of the disclosure, therefore, is to be determined solely by the following claims.

The invention claimed is:

1. An inlet guide vane comprising:
a plurality of movable blades disposed at intervals in a circumferential direction of a rotor shaft, the movable blades being rotatable about a center axis extending in a radial direction of the rotor shaft, wherein
each of the movable blades includes
a first blade surface and a second blade surface extending in a direction connecting a leading edge and a trailing edge, and
an inclined surface formed at a trailing end including the trailing edge, the inclined surface extending obliquely from the first blade surface to the second blade surface when viewed from the radial direction,
the inclined surface is a flat surface whose cross-sectional shape viewed from the radial direction is inclined so as to be connected, at an acute angle, to the second blade surface at the trailing edge, and
the inclined surface is inclined at an angle of 15° or more and 45° or less with respect to the second blade surface when viewed from the radial direction.

2. The inlet guide vane according to claim 1, wherein each of the first blade surface and the second blade surface is formed of a flat surface whose cross-sectional shape viewed from the radial direction forms a straight line in a direction connecting the leading edge and the trailing edge, and the first blade surface and the second blade surface are parallel to each other.

3. The inlet guide vane according to claim 1, wherein
the plurality of movable blades increase an opening degree by rotating toward a reverse side to a rotational direction of the rotor shaft, and
the first blade surface is located in front of the second blade surface in the rotational direction.

4. A rotary machine comprising:
a rotor including a rotor shaft extending in an axial direction in which an axis extends with the axis as a center, and an impeller fixed to the rotor shaft;
a casing covering the rotor and including a suction port through which a working fluid flows into the casing; and
the inlet guide vane according to claim 1 disposed in the casing on a first side in the axial direction with respect to the impeller.

* * * * *